United States Patent Office 3,502,661
Patented Mar. 24, 1970

3,502,661
PROCESS FOR MAKING 1,4,5,6-TETRAHYDRO-2-
[(2-SUBSTITUTED)VINYL] PYRIMIDINES AND 2-
[(2-SUBSTITUTED)VINYL]-2-IMIDAZOLINES
Robert V. Kasubick, Gales Ferry, and James W. McFarland, Lyme, Conn., assignors to Chas. Pfizer & Co., Inc., New York, N.Y., a corporation of Delaware
No Drawing. Continuation-in-part of application Ser. No. 643,391, June 5, 1967, which is a continuation-in-part of application Ser. No. 615,897, Feb. 14, 1967. This application Nov. 9, 1967, Ser. No. 681,907
Int. Cl. C07d 51/38, 49/34; A61k 27/00
U.S. Cl. 260—240
10 Claims

ABSTRACT OF THE DISCLOSURE

In the direct aldehyde condensation process for making 2-[(2-substituted)vinyl]cyclic amidines, e.g. tetrahydropyrimidines and imidazolines by the condensation of an aldehyde with a 2-methyl substituted cyclic amidine, the improvement which comprises conducting the condensation in the presence of a chemical water scavenger such as an ester of formic acid, of chloroformic acid or of carbonic acid.

CROSS-REFERENCE TO RELATED APPLICATIONS

This application is a continuation-in-part of our now abandoned application Ser. No. 643,391, filed June 5, 1967 which, in turn, is a continuation-in-part of application Ser. No. 615,897, filed Feb. 14, 1967 and now abandoned.

BACKGROUND OF THE INVENTION

This invention relates to an improved process for making 1,2-disubstituted vinyl compounds and their acid addition salts, and, more particularly, to an improvement in the direct aldehyde condensation process for making 1,4,5,6-tetrahydro - 2 - [(2-substituted)vinyl]pyrimidines and 2-[(2-substituted)vinyl]-2-imidazolines and their acid addition salts, which are valuable anthelmintic agents.

The preparation of 2-[(2-substituted)vinyl]cyclic amidines having the formula:

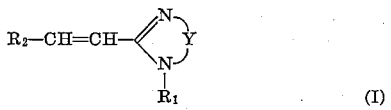

(I)

by the direct condensation of an aldehyde of the formula:

$$R_2\text{—CHO} \qquad (II)$$

wherein $R_2$ is selected from the group consisting of:

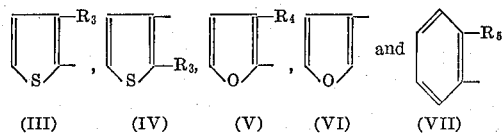

(III)  (IV)  (V)  (VI)  (VII)

wherein $R_3$ is selected from the group consisting of hydrogen, methyl, ethyl, chloro, bromo and iodo; $R_4$ is selected from the group consisting of hydrogen and methyl; and $R_5$ is selected from the group consisting of hydrogen, chloro, bromo, iodo, fluoro, methyl, ethyl, mercapto and methylthio; with a 2-methyl substituted cyclic amidine of the formula:

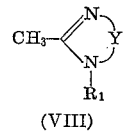

(VIII)

wherein $R_1$ is selected from the group consisting of hydrogen and methyl; and Y is selected from the group consisting of ethylene and trimethylene, under conditions which result in the effective removal of by-product water by means of a binary azeotrope or a molecular sieve as adsorbent, described in Belgian Patent 681,413, granted Nov. 23, 1966, is a simple and convenient process which is eminently productive of satisfactory yields in small scale reactions. In large scale reactions, however, the yields frequently tend to fall off due to an accumulation of by-product water. The removal of the by-product water by the use of a solvent which forms a binary azeotrope with the water or by means of a molecular sieve as adsorbent is not rapid enough in most instances of large scale reactions to avoid an accumulation of water and subsequent degradation of the cyclic amidine product. The accumulated water appears to hydrolyze the cyclic amidine product resulting in a reduced yield. This is especially true of those condensations which occur at a rapid rate.

SUMMARY OF THE INVENTION

It has now been found that the effective removal of by-product water on both small and large scale reactions can be conveniently and essentially completely achieved by the use of chemical scavengers which react with the water at a sufficiently rapid rate so as to prevent its accumulation and thus successfully minimize hydrolysis of the cyclic amidine products. The use of such scavengers is independent of the reaction scale and reaction equipment used. Additionally, they do not require the use of specialized equipment or techniques and avoid the problems normally associated with the handling and recovery of large volumes of solvents, particularly organic solvents, at elevated temperatures.

It has been found that aliphatic, aralkyl or aromatic esters of formic, chloroformic and carbonic acids are useful as chemical water scavengers in the process of this invention. The principal criterion for their selection is that they react with the by-product water at a fast enough rate to prevent its accumulation.

The scavengers described herein represent the most desirable scavengers. It will be obvious to those skilled in the art that other esters of formic, chloroformic and carbonic acids can be used in view of the criterion set forth.

In the case of the chloroformates and other esters, e.g., p-nitrophenylformate, which form substances of sufficient acidity upon hydrolysis to combine with the 2-methyl cyclic amidine reactant, the use of an excess of the 2-methyl cyclic amidine over that which might normally be used is often desirable. Alternatively, when using such esters, the use of a strongly basic substance, e.g., an alkali (sodium, potassium) alkoxide can be used in place of an excess of the 2-methyl cyclic amidine if desired to effectively remove the acid reacting hydrolysis product. Suitable esters can readily be determined by simple experiment, as for example, by performing the herein described condensation in the presence of said scavenger and determining the yield of desired product. Alternatively, suitable scavengers are determined by observing the hydrolysis rates of the selected scavenger.

The preferred scavengers are those having the formulae:

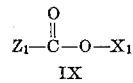

and

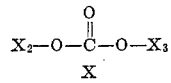

wherein $Z_1$ is selected from the group consisting of hydrogen and chloro; $X_1$ is selected from the group consisting of alkyl, preferably alkyl having from 1 to 6 carbon atoms, cycloalkyl having from 3 to 6 carbon atoms, allyl, crotyl, benzyl and

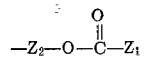

wherein $Z_2$ is alkylene containing from 2 to 4 carbon atoms; $X_2$ and $X_3$ when taken separately are each alkyl, preferably alkyl having from 1 to 6 carbon atoms; and $X_2$ and $X_3$ when taken together form an alkylene bridging member having from 2 to 4 carbon atoms.

The process of the invention, in its broadest sense, comprises reacting an aldehyde of the formula $R_2$—CHO wherein $R_2$ is as defined above with a 2-methyl substituted cyclic amidine of Formula VIII in the presence of the herein described chemical water scavengers. The reaction can, if desired, be conducted in the presence of a reaction-inert solvent, that is, one which does not react in an undesired manner with the reactants or products. A reaction-inert solvent is advantageously used if the reaction mixture of aldehyde, 2-methyl cyclic amidine and water scavenger is not sufficiently fluid, either a homogeneous solution or a readily stirrable suspension, under the particular reaction conditions used. The need for a solvent would arise, for example, in the situation wherein the aldehyde is a solid at the reaction temperatures used and did not enter completely into solution. Suitable solvents are those organic solvents in which the reactants are soluble. There may be mentioned, for example, aliphatic alcohols such as methanol, ethanol, butanol, hexanol; ethers such as diethyl, dipropyl and diisopropyl ether.

However, in the preferred embodiment of this invention no solvent is used since reaction conditions are such that a single phase reaction mixture is formed. Most of the aldehydes of interest are liquids as are the 1,2-dimethyl cyclic amidines and the chemical water scavengers of interest. The 2-methyl cyclic amidines are solids readily soluble in the scavengers of interest.

DETAILED DESCRIPTION OF THE INVENTION

The relative proportions of reactants, aldehyde: 2-methyl cyclic amidine: chemical water scavenger, can, as implied above, vary widely. While the aldehyde and 2-methyl cyclic amidine can be reacted in equimolar amounts, either reactant can be used in excess of a molar equivalent of the other reactant with production of significant amounts of the desired product. While it is usually more efficient to use an excess of the most readily available or less expensive reactant, the present process is favored by using an excess of the 2-methyl cyclic amidine. However, since these two reactants combine on a molar basis, the yield of resulting product, other parameters being identical, is controlled by the reactant present in the least amount.

The amount of chemical water scavenger used can vary widely, from less than a molar proportion based upon the reactant (aldehyde or 2-methyl cyclic amidine) present in smallest amount, to a large excess based upon said reactant. For optimum yields, of course, at least a molar proportion of chemical water scavenger based upon the amount of by-product water to be produced is favored. In actual practice an excess of the chemical water scavenger is used, the excess being determined principally by economic factors.

In the broadest sense of this invention the molar ratios of aldehyde:cyclic amidine:scavenger desirably range from about 1:1:1 to about 1:2:4. The preferred range of reactants is from about 1:1:1 to about 1:1.2:3. Other ratios, for example, wherein the aldehyde is present in excess, e.g., 2:1:4, can be used, as can greater excesses of scavenger, but appear to offer no advantage.

The time required for completion of the reaction, of course, varies with the size of the reaction and the temperature at which the reaction is conducted. Generally, temperatures of from about 0° to 70° C. and reaction periods of from about 72 hours to about one hour are satisfactory. The higher the temperature of the reaction the shorter the reaction period required for optimum yield. The more reactive aldehydes may require less time than indicated and the less reactive aldehydes may require a greater time period. Reaction temperatures higher than 70° C. along with shorter reaction periods can be used but appear to offer no advantage.

At temperatures below about 25° C. and with relatively short reaction periods, e.g. about 6 hours or less, an intermediate aldol is isolatable. The aldols correspond to the compounds of Formula I wherein the elements of water are attached to the vinylene group, the hydroxy group being on the carbon beta to the cyclic amidine moiety. The aldols can be dehydrated to the corresponding vinylene compounds by means of acid dehydrating agents such as acetic anhydride, hydrogen chloride, hydrogen bromide, hydrogen fluoride, trifluoroacetic acid, nitric acid, sulfuric acid and phosphoric acid.

The products can be isolated from the reaction mixture by methods well known to those skilled in the art. They may, for example, when a formic acid ester is used as scavenger, be isolated directly from the reaction mixture as the formate salts by evaporation of the reaction mixture or precipitation of the salt therefrom by addition of a solvent in which the formate salt is insoluble. Alternatively, the products can be isolated in the form of an acid addition salt other than the formate by treating the reaction mixture with the appropriate acid such as hydrochloric acid, citric acid, tartaric acid, perchloric acid, pamoic acid and hexafluorophosphoric acid. In still another method the product can be recovered in the form of the free base by neutralization of the reaction mixture and isolation of the free base by evaporation and/or distillation.

The use of a carbonic acid ester as scavenger permits convenient recovery of the free base simply by evaporation of the reaction mixture. Alternatively, as when using formic acid esters as scavengers, the products are readily isolated as acid addition salts by treating the reaction mixture with the appropriate acid. The use of a chloroformate ester permits recovery of the product as the hydrochloride salt by evaporation of the reaction mixture or by precipitation of the salt with appropriate solvents in which the salt is insoluble.

In the preferred embodiment of this invention the aldehyde, 2-methyl cyclic amidine and chemical water scavenger are reacted at a temperature of from about 25° C to about 70° C. in a molar proportion of from about 1:1:1 to about 1:1.2:3 for a period of from about 1 to about 48 hours. When using a dialkyl carbonate (Formula X) the preferred temperature range is from about 40° C. to about 70° C. and the reaction period from about 6 to about 48 hours. The preferred chemical water scavengers are methyl formate, ethyl formate, dimethyl carbonate and diethyl carbonate. It is most advantageous, but not necessary, to add the aldehyde to a solution of the 2-methyl cyclic amidine in the water scavenger of choice. The product is recovered by adding the reaction mixture to an alcoholic solution of the desired acid, for example, citric acid in isopropanol or tartaric acid in ethanol whereby the appropriate acid addition salt is produced. The salts themselves are isolated by well-known methods such as filtration, concentration followed by filtration or precipitation by addition of a solvent in which the salt is insoluble, followed by filtration.

Among the acids which can be used to produce the acid addition salts are both the pharmaceutically acceptable and pharmaceutically unacceptable acids. Among these may be mentioned, for example, hydrochloric, hydrobromic, hydrofluoric, phosphoric, sulfuric, nitric, acetic, propionic, butyric, hexafluorophosphoric, citric, tartaric, maleic, fumaric, trifluoroacetic, succinic, oxalic, gluconic, lauric, benzoic, sulfosalicylic, malic, amsonic (4,4'-diaminostilbene-2,2'-disulfuric), pamoic (1,1' - methylene-bis-2-hydroxy-3-naphthoic), stearic, 3-hydroxy-2-naphthoic, p-toluenesulfonic, suramin (s - bis( - m - aminobenzoyl-m-amino-p-methyl benzoyl - 1 - naphthylamino-4,6,8-trisulfonic)) carbamide and resin adsorbates. The hydrochloride, citrate and tartrate salts are especially valuable as a means of isolating the cyclic amidine products. They precipitate out rapidly and almost quantitatively as crystalline products which are readily purified by recrystallization from appropriate solvents.

The process of this invention affords substantially better yields than does the same condensation when conducted in the absence of a chemical water scavenger. Yields of 50% and higher are readily obtained by this improved process. In the synthesis of 1-methyl-1,4,5,6-tetrahydro -2-[2-(2-thienyl)vinyl]pyrimidine citrate for example, the present process affords a yield of 85% compared to a yield of only 45% when the condensation is conducted under azeotropic removal of water.

As noted above, the compounds described herein are valuable agents for the veterinary control of helminthiasis. They are effective via the oral and parenteral routes of administration. The term "control" is intended to include therapeutic and prophylactic use of the herein described compounds. The preferred method of using these compounds is via the oral route of administration. When so used, these compounds are administered in dosages equivalent to from about 0.5 to about 150 mg. (calculated as free base) per kg. of body weight. This can be achieved by a number of methods including mixing with the feed, dosage unit formulations such as capsules, tablets, liquid mixtures and solutions including drench solutions, or they can be administered in admixture with minerals such as sodium chloride which are frequently fed to animals as a supplement. Although the dosage specified is based on active ingredient, namely the base form of the cyclic amidine, in practical use the non-toxic acid addition salts specified and the free base can be used interchangeably, except as otherwise noted below.

Those skilled in the art will recognize that these compounds when used parenterally may be administered subcutaneously or intramuscularly. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

Methods of studying the sensitivity of the previously mentioned group of parasites to chemotherapeutic agents comprise selecting a laboratory-induced parasitic infestation of a laboratory animal exhibiting a similar host-parasite relationship to that found between such parasites and domestic animals. Such a relationship exists between *Nematospiroides dubius* and laboratory mice. The test with *N. dubius* in laboratory mice is carried out by collecting the fecal matter of an infected mouse and suspending it in moist charcoal. Patties are prepared and these are incubated at room temperature for 4 to 5 days until the oval hatch and larvae are produced. The larvae are then collected and used to inoculate healthy mice. It has been found that an inoculum of 40 larvae per mouse yields a flourishing infestation consisting of about 30 adult worms after a 14-day developmental period. Established anthelmintics have been found to be ineffective against an inoculum of this size.

The activity of several of the compounds described herein against *N. dubius* is presented below. The values presented, unless otherwise indicated, are MED (minimum effective dose required to produce at least a 90% reduction in the *N. dubius* burden) values.

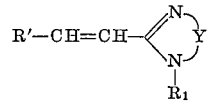

| R' | R₁ | Y ᵃ | Salt | MED, mg./kg. |
|---|---|---|---|---|
| Phenyl | H | Tri | Maleate | >250 |
| Do | CH₃ | Tri | HPF₆ | 62.5 |
| o-Tolyl | CH₃ | Eth | HPF₆ | 62.5 |
| Do | H | Tri | HCl | >125 |
| Do | CH₃ | Tri | 1.5 HCl | 8 |
| Do | CH₃ | Tri | Tartrate | 12.5 |
| o-Ethylphenyl | CH₃ | Tri | Fumarate | 30 |
| Do | CH₃ | Tri | HPF₆ | 62.5 |
| o-Chlorophenyl | CH₃ | Tri | Tartrate | 7 |
| o-Bromophenyl | CH₃ | Tri | HPF₆ | 15.1 |
| Do | CH₃ | Tri | Tartrate | 7 |
| 2-furyl | CH₃ | Tri | Citrate | 12.5 |
| Do | CH₃ | Eth | HCl | ᶜ >250 |
| 3-methyl-2-furyl | CH₃ | Tri | HPF₆ | 125 |
| o-Fluorophenyl | CH₃ | Tri | HPF₆ | 62.5 |
| 2-thienyl | H | Eth | Maleate | ᵇ 100 |
| Do | CH₃ | Eth | Tosylate | 50 |
| 3-methyl-2-thienyl | CH₃ | Eth | HCl | 25 |
| 2-thienyl | H | Tri | Maleate | 50 |
| Do | CH₃ | Tri | Tartrate | 12.5 |
| 2-thienyl (cis) | CH₃ | Tri | Tartrate | ᵇ 250 |
| 3-methyl-2-thienyl | H | Tri | HCl | 125 |
| Do | CH₃ | Tri | HCl | 3-1 |
| 3-methyl-2-thienyl (cis) | CH₃ | Tri | HCl | ᵇ 250 |
| 3-ethyl-2-thienyl | CH₃ | Tri | Fumarate | 25 |
| 3-bromo-2-thienyl | CH₃ | Tri | Tartrate | 25 |
| 3-thienyl | CH₃ | Tri | Fumarate | 25 |

ᵃ eth=ethylene; tri=trimethylene.
ᵇ Dose administered on three days.
ᶜ 79% reduction at 250 mg./kg.

The MED of 1,4,5,6 - tetrahydromethyl - 1 - methyl-2-(2-methylstyryl)pyrimidine hydrochloride in dogs versus hookworms and ascarids is 2 and 4 mg./kg., respectively.

For parenteral use a dosage equivalent to from about 5 to about 150 mg. (calculated as free base) per kg. of body weight of the free base or a non-toxic acid addition salt thereof is administered. For prophylactic use, 0.5 to 50 mg. (calculated as free base) per kg. of body weight daily is administered.

The following examples are given by way of illustration and are not to be construed as limitations of this invention, many variations of which are possible within the scope and spirit thereof.

EXAMPLE I 1-methyl-1,4,5,6-tetrahydro-2-[2-(2-thienyl)vinyl]-pyrimidine citrate Thiophene-2-carboxaldehyde (20.0 moles) is added with stirring to a solution of 1,2-dimethyl-1,4,5,6-tetrahydropyrimidine (23.5 moles) in methyl formate (33.0 moles) over a period of 18 minutes. The internal temperature of the reaction mixture is held at 30° C.±2° C. during addition and the mixture then stirred for 18 hours at room temperature.

The reaction mixture is divided into two portions. The first portion (3.45 kg.) is added over a period of 1.3 hours to a well-stirred solution of citric acid (11 moles) in isopropanol (30 l.) at 58° C. The resulting slurry is cooled to 38° C. and the citrate salt recovered by filtration. It is washed first with isopropanol, then with diethyl ether and air-dried. Yield=3563 g.; M.P. 168°–174° C. (dec.).

The salt is purified by dissolving in hot methanol (54 l.), filtering and concentrating the filtrate to about one-third volume. The concentrated solution is chilled to 5° C., the product recovered by filtration and air-dried. Yield=2770 g.; M.P. 177°–182° C.

A second crop of 138.3 g., M.P. 177°–182° C. is recovered from the filtrates by further concentration. Total yield=2908 g. or 71% overall yield.

EXAMPLE II 1-methyl-1,4,5,6-tetrahydro-2-[2-(2-thienyl)vinyl]-pyrimidine tartrate The second portion of reaction mixture from the preceding example (3.2 kg.) is added to a well stirred solution of tartaric acid (10 moles) in ethanol (30 l.) at 27° C. The mixture is stirred for two hours and the product recovered by filtration. The filter cake is washed with cold ethanol followed by ether and air-dried. Yield=2151 g.; M.P. 144–147° C.

The tartrate salt is recrystallized by dissolving in hot methanol (2.5 l.), filtering, adding hot ethanol (7 l.) to the filtrate and cooling. The product is collected and air-dried. Yield=1850 g.; M.P. 148–150° C. A second crop (170 g.) is obtained from the filtrate for a total yield of 59%.

EXAMPLE III 1-methyl-1,4,5,6-tetrahydro-2-[2-(2-thienyl)vinyl]-pyrimidine hydrochloride A solution of thiophene-2-carboxaldehyde (0.1 mole), 1,2-dimethyl-1,4,5,6-tetrahydropyrimidine (0.1 mole) and methyl formate (0.33 mole) is allowed to stand at room temperature for 72 hours. The methyl formate is then evaporated under reduced pressure, and the residue treated with 40 ml. of 10% hydrogen chloride in isopropanol. The volatile components are evaporated and the residue taken up in acetonitrile (25 ml.). This solution is evaporated and the residue again taken up in acetonitrile (25 ml.). The hydrochloride salt separates upon cooling the solution to 0°–5° C.; M.P. 193°–196° C.; yield=50%.

Repetition of this reaction procedure but using a different work-up procedure improves the product recovery. The reaction mixture is stirred into enough 1.0 N hydrochloric acid to neutralize the amidines present, the aqueous solution washed once with ethylacetate, then evaporated under reduced pressure to a thick syrup. The syrup is dissolved in hot isopropanol and the solution evaporated. The residue is again taken up in isopropanol then cooled to 0°–5° C. A 54% yield of the hydrochloride salt is obtained.

EXAMPLE IV 1-methyl-1,4,5,6-tetrahydro-2-[2-(2-thienyl)vinyl]-pyrimidine perchlorate A solution of 0.1 mole of each of thiophene-2-carboxaldehyde and 1,2-dimethyl-1,4,5,6-tetrahydropyrimidine in methyl formate (0.2 mole) is held at 40° C.–45° C. for 18 hours. The methyl formate is evaporated under reduced pressure and the residue taken up in 1.0 N hydrochloric acid (100 ml.). The acid solution is washed once with ethyl acetate (50 ml.) then treated with 70% perchloric acid (10 ml., 0.116 mole). The perchlorate salt precipitates, is collected and air-dried to a constant weight; M.P. 146°–147° C.; yield=68%.

Repetition of the above procedure but using ethyl formate in place of methyl formate as scavenger affords a 59% yield of the perchlorate salt.

EXAMPLE V

The procedure of Example IV is repeated but using 0.167 mole of methyl formate as scavenger rather than 0.2 mole and the time and temperature levels indicated below.

| Temperature, °C.: | Time (hours) | Percent yield (Perchlorate salt) |
|---|---|---|
| 0–5 | 48 | 47 |
| 0–5 | 72 | 50 |
| 23–25 | 48 | 64 |
| 23–25 | 72 | 68 |
| 40–45 | 1 | 49 |
| 40–45 | 2 | 56 |
| 40–45 | 4 | 59 |
| 40–45 | 7 | 63 |

EXAMPLE VI

The procedure of Example IV is repeated but using varying ratios of methyl formate as indicated below

| Moles: | Percent yield (Perchlorate salt) |
|---|---|
| 0.1 | 66 |
| 0.2 | 69 |
| 0.3 | 72 |
| 0.4 | 63 |

EXAMPLE VII

The procedure of Example IV is repeated but using a molar ratio of thiophene-2-carboxaldehyde:methyl formate of 1.00:1.60. The molar ratio of 1,2-dimethyl-1,4,5,6-tetrahydropyrimidine (DMTP) used and other variables studied are noted below.

| | Temp., °C. | Time (hours) | Yield |
|---|---|---|---|
| Moles DMTP: | | | |
| 1.00 | 27 | 24 | 64 |
| 1.05 | 27 | 24 | 75 |
| 1.20 | 27 | 20 | 85 |
| 1.20 | 40 | 6 | 85 |

EXAMPLE VIII 1-methyl-1,4,5,6-tetrahydro-2-[2-(2-methylstyryl)]-pyrimidine formate Ortho-tolualdehyde (0.1 mole) is added to a solution of 1,2-dimethyl-1,4,5,6-tetrahydropyrimidine (0.12 mole) in methyl formate (0.167 mole) and the mixture held at 43° C. for 18 hours. Evaporation of the reaction mixture under reduced pressure produces a yellow oil which soon solidifies. Trituration with hexane gives a solid 17 g. (68%). It is purified by trituration with acetone to give a white solid followed by two recrystallizations from acetone; M.P. 130°–131° C.

It is converted to the sesquihydrochloride by addition to a methanolic-hydrogen chloride solution. Evaporation of the solution affords a thick oily residue which when treated with benzene and evaporated gives a solid residue. Trituration with isopropanol followed by filtration gives the sesquihydrochloride; M.P. 184°–188° C.

EXAMPLE IX 1-methyl-1,4,5,6-tetrahydro-2-[2-(2-thienyl)vinyl]pyrimidine

A solution of 0.1 mole of each of thiophene-2-carboxaldehyde and 1,2-dimethyl-1,4,5,6-tetrahydropyrimidine in dimethyl carbonate (0.2 mole) is held at 27° C. for 48 hours. The reaction mixture is then stripped to give a 65% yield of product as the free base.

It is converted to the citrate salt by the procedure of Example I.

Repetition of the above procedure but using a molar ratio of reactants of 1:1.2:3 and appropriate reaction periods produces at least the same yield whether the reaction is conducted at temperatures of 5° (1 week), 15° (48 hours), 40° (6 hours) or 60° C. (2 hours).

EXAMPLE X

Following the procedure of Example VIII but using the appropriate reactants in a molar ratio of aldehyde:1,2- dimethyl cyclic amidine:methyl formate of 1:1.2:3 produces the products listed below. The various salts are isolated by treating the reaction mixture with an alcoholic solution of the proper acid.

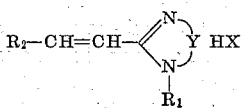

EXAMPLE XII 2-methyl-1,4,5,6-tetrahydro-2-[2-(2-thienyl) vinyl]pyrimidine 1,2-dimethyl-1,4,5,6-tetrahydropyrimidine (0.6 mole) is slowly added with stirring and cooling to a solution of thiophene-2-carboxaldehyde (0.50 mole) in methyl chloroformate (0.85 mole) at a temperature of 30°–35° C. The mixture is stirred for 25 hours at ambient temperature and the product isolated as the perchlorate salt by the procedure of Example IV; yield=60%.

| $R_1$ | $R_2$ | Y | Salt | Recrystallization Solvent | M.P. (° C.) |
|---|---|---|---|---|---|
| $CH_3$ | o-Tolyl | Ethylene | $HPF_6$ | Methanol | 189–190 |
| $CH_3$ | 2-chlorophenyl | Trimethylene | Tartrate | Ethanol/ether | 177–179 |
| $CH_3$ | 2-bromophenyl | do | $HPF_6$ | Ethanol | 151–154 |
| H | o-Tolyl | do | HCl | Isopropanol | 210–211 |
| H | 2-thienyl | Ethylene | Maleate | do | 162–163 |
| $CH_3$ | do | do | Tosylate | do | 162–164 |
| $CH_3$ | 3-methyl-2-thienyl | do | HCl | Methanol | 189–190 |
| $CH_3$ | do | Trimethylene | Tartrate | Methanol/ethanol | 170–171 |
| $CH_3$ | 2-furyl | Ethylene | HCl | Isopropanol/isopropyl ether | 93–94 |

EXAMPLE XI

The compounds listed below are prepared from the appropriate reactants by the procedure of Example III. The particular chemical water scavenger used in a given preparation is also listed. The salts isolated are obtained by treating the reaction mixture with an alcoholic solution of the acid according to the procedure of Example II.

EXAMPLE XIII

Various 2-[(2-substituted)vinyl] cyclic amidines of Formula I are prepared by the procedure which comprises adding the appropriate 2-methyl cyclic amidine

| $R_1$ | $R_2$ | Y | Scavenger | Salt |
|---|---|---|---|---|
| H | 2-thienyl | Trimethylene | Dimethylcarbonate | Citrate. |
| H | 3-methyl-2-thienyl | do | n-Propyl formate | Tartrate. |
| H | 3-ethyl-2-thienyl | do | do | Do. |
| H | 3-chloro-2-thienyl | do | Isopropyl formate | Do. |
| H | 3-iodo-2-thienyl | do | n-Butyl formate | Do. |
| H | 3-bromo-2-thienyl | do | n-Hexyl formate | Do. |
| $CH_3$ | 3-ethyl-2-thienyl | do | Methyl formate | HCl. |
| $CH_3$ | 3-chloro-2-thienyl | do | do | HCl. |
| $CH_3$ | 3-iodo-2-thienyl | do | do | HCl. |
| $CH_3$ | 3-thienyl | do | Diethyl carbonate | $HPF_6$. |
| $CH_3$ | 2-methyl-3-thienyl | do | do | $HPF_6$. |
| $CH_3$ | 2-ethyl-3-thienyl | do | do | $HPF_6$. |
| $CH_3$ | 2-bromo-3-thienyl | do | Allyl formate | Formate. |
| $CH_3$ | 2-chloro-3-thienyl | do | do | Do. |
| $CH_3$ | 2-iodo-3-thienyl | do | Cyclopentyl formate | Do. |
| H | 3-thienyl | do | Decylformate | HBr. |
| H | 2-methyl-3-thienyl | do | n-Propyl formate | HCl. |
| H | 2-ethyl-3-thienyl | do | Ethylene carbonate | $H_3PO_4$. |
| H | 2-chloro-3-thienyl | do | di-n-Butyl carbonate | $H_2SO_4$. |
| H | 2-bromo-3-thienyl | do | Dimethyl carbonate | Acetate. |
| H | 2-iodo-3-thienyl | do | Diethyl carbonate | Butyrate. |
| H | 3-methyl-2-thienyl | Ethylene | Benzyl formate | Maleate. |
| H | 3-ethyl-2-thienyl | do | do | Fumarate. |
| H | 3-chloro-2-thienyl | do | Methyl formate | Oxalate. |
| H | 3-bromo-2-thienyl | do | do | Gluconate. |
| H | 3-iodo-2-thienyl | do | Ethyl formate | Do. |
| H | 3-thienyl | do | Crotyl formate | Pamoate. |
| H | 2-methyl-3-thienyl | do | Methyl formate | Do. |
| H | 2-ethyl-3-thienyl | do | do | Do. |
| H | 2-chloro-3-thienyl | do | do | Amsonate. |
| H | 2-bromo-3-thienyl | do | do | Do. |
| H | 2-iodo-3-thienyl | do | Ethyl formate | Do. |
| H | 2-furyl | do | do | Tartrate. |
| H | 3-methyl-2-furyl | do | Dimethylcarbonate | Sulfosalicylate. |
| $CH_3$ | do | do | do | Benzoate. |
| $CH_3$ | 2-furyl | do | Butylene carbonate | HCl. |
| H | do | Trimethylene | Diethylcarbonate | Citrate. |
| $CH_3$ | do | do | do | Tartrate. |
| H | 3-methyl-2-furyl | do | Dioctylcarbonate | $HPF_6$. |
| $CH_3$ | do | do | Diethylcarbonate | $HPF_6$. |
| H | 3-furyl | do | Ethylenecarbonate | $HPF_6$. |
| $CH_3$ | do | do | do | HCl. |
| H | do | Ethylene | do | HCl. |
| $CH_3$ | do | do | do | HCl. |
| H | Phenyl | do | Ethylene bis formate | Citrate. |
| $CH_3$ | do | do | do | Do. |
| H | do | Trimethylene | Methyl formate | HBr. |
| $CH_3$ | do | do | do | HCl. |
| H | p-Tolyl | do | Octadecyl formate | Succinate. |
| H | m-Tolyl | Ethylene | Dimethylcarbonate | Do. |
| $CH_3$ | 2-ethylphenyl | do | do | Benzoate. |
| $CH_3$ | do | Trimethylene | Methyl formate | $HPF_6$. |
| $CH_3$ | 2-mercaptophenyl | do | do | $HPF_6$. |
| H | 2-bromophenyl | do | do | Amsonate. |
| H | 2-iodophenyl | do | Methylethylcarbonate | Do. |
| $CH_3$ | 2-fluorophenyl | do | do | Pamoate. |
| $CH_3$ | 2-methylthiophenyl | do | do | Do. |
| $CH_3$ | 2-chlorophenyl | Ethylene | do | Do. |
| $CH_3$ | 2-bromophenyl | do | do | HCl. |
| H | 2-mercaptophenyl | do | Dimethylcarbonate | Citrate. |
| H | 2-chlorophenyl | Trimethylene | do | Tartrate. |
| H | 2-mercaptophenyl | do | do | HCl. |
| H | 2-fluorophenyl | Ethylene | Octadecylcarbonate | $HPF_6$. |
| H | 2-ethylbenzyl | Trimethylene | Dimethylcarbonate | HCl. |
| H | do | Ethylene | do | HCl. |
| H | 2-mercaptophenyl | do | Methylformate | $HPF_6$. |
| H | 2-methylthiophenyl | Trimethylene | Dimethylcarbonate | Tartrate. | of Formula VIII to a solution of the desired aldehyde $R_2$—CHO in a chloroformate $$Cl-\overset{\overset{O}{\|}}{C}-O-X_1$$

The conditions of the reactions, e.g., time, temperature and molar proportions of reactants, the chloroformate used and the compounds produced are tabulated below. The products are isolated as their hydrochloride salts by evaporation of all volatile materials under reduced pressure.

| Scavenger Cl-COOX$_1$ X$_1$= | Time (hrs.) | Temp.,° C. | Molar ratio of Reactants [1] | R$_1$ | R$_2$ | Y$_1$ [2] |
|---|---|---|---|---|---|---|
| Ethyl | 25 | 25 | 1:1.2:1.7 | CH$_3$ | 2-thienyl | Tri |
| n-Propyl | 20 | 40 | 1:1.2:1.7 | CH$_3$ | do | Tri |
| Hexyl | 10 | 45 | 1:1.2:2 | CH$_3$ | do | Eth |
| Allyl | 50 | 23–25 | 1:1.2:1.67 | H | 3-thienyl | Tri |
| Crotyl | 18 | 65–70 | 1:1.2:1.2 | CH$_3$ | 3-methyl-2-thienyl | Tri |
| Benzyl | 2 | 65–70 | 1:1.2:1.7 | CH$_3$ | 2-chlorophenyl | Tri |
| (CH$_2$)$_2$-O-COCl | 12 | 35–40 | 1:1.2:0.8 | H | 2-thienyl | Tri |
| (CH$_2$)$_4$-O-COCl | 15 | 27–30 | 1:1.2:0.85 | CH$_3$ | do | Eth |
| Methyl | 20 | 30–45 | 1:1.2:1.7 | H | 2-methyl-thiophenyl | Eth |
| Do | 20 | 30–35 | 1:1.2:1.7 | CH$_3$ | do | Eth |

[1] R$_2$CHO: cyclic amidine: scavenger.
[2] Tri=trimethylene; ethy=ethylene.

PREPARATION A 3-ethyl-2-thiophenecarboxaldehyde

Prosphorus oxychloride (20 g.) is added over 30 minutes to a stirred mixture of 3-ethylthiophene (11.2 g.) and dimethylformamide (8.4 g.) heated on a steam bath. Heating is continued for a further hour, and the mixture then cooled and poured into ice-water (150 ml.). After addition of sodium acetate to raise the pH to 5, the mixture is extracted with ether, and the ether extract washed with water, dried (MgSO$_4$) and heated to distil off ether. The residue is fractionally distilled, and the fraction of B.P. 114°–116° C. at 17 mm. collected.

Examination of this fraction by gas-liquid chromatography, and a consideration of its infra-red absorption and nuclear magnetic resonance properties, showed it to be a mixture of the desired 3-ethyl compound with its 4-ethyl isomer in the proportions 5:2.

Repetition of this procedure but using 2-ethylthiophene, in place of 3-ethylthiophene affords 2-ethyl-3-thiophene-carboxaldehyde.

PREPARATION B 2-(3-thienyl)-1,3-dioxolane

A solution of 0.38 mole of 3-thiophenecarboxaldehyde, 0.47 mole of ethylene glycol, 100 ml. of benzene and a few crystals of p-toluenesulfonic acid is heated under reflux in an apparatus which includes a Dean-Stark moisture trap. Heating is continued until no more water separates. The benzene layer is washed successively with sodium bicarbonate solution and water, dried and then fractionally distilled to yield the acetal, 2-(3-thienyl)-1,3-dioxolane.

PREPARATION C 2-(2-iodo-3-thienyl)-1,3-dioxolane

To a stirred mixture of 0.42 mole of 2-(3-thienyl)-1,3-dioxolane and benzene (cooled to 0° C. in an ice bath), 0.35 mole of mercuric oxide and 0.43 mole of iodine are added alternately in small amounts during a period of 15–20 minutes. The mixture is filtered, and the residue is washed three times with 25 ml. portions of ether. The filtrate is shaken with a 5% solution of sodium thiosulfate to remove excess iodine and is then dried over anhydrous sodium sulfate. After filtration of the drying agent, the ether and benzene are removed from the filtrate by distillation. The residue is fractionally distilled under reduced pressure to afford pure 2-(2-iodo-3-thienyl)-1,3-dioxolane.

PREPARATION D 2-iodo-3-thiophenecarboxaldehyde

A solution of 2-(2-iodo-3-thienyl)-1,3-dioxolane, 75% aqueous ethanol and several drops of concentrated hydrochloric acid is heated under reflux for several hours. The solution is evaporated under reduced pressure, and the residue is distilled to furnish a mixture of 2-iodo-3-thiophenecarboxaldehyde and 5-iodo-2-thiophenecarboxaldehyde. The isomers are separated by preparative scale vapor phase chromatography.

What is claimed is:

1. In a process for making a compound having the formula:

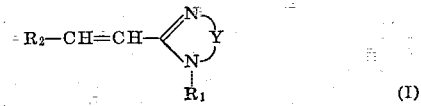

(I)

which comprises condensing (a) an aldehyde of the formula:

$$R_2-CHO$$

wherein R$_2$ is selected from the group consisting of:

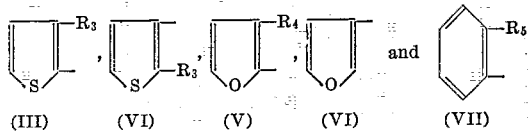

(III)   (VI)   (V)   (VI)   (VII)

wherein R$_3$ is selected from the group consisting of hydrogen, methyl, ethyl, chloro, bromo and iodo; R$_4$ is selected from the group consisting of hydrogen and methyl; R$_5$ is selected from the group consisting of hydrogen, chloro, bromo, iodo, fluoro, methyl, ethyl, mercapto and methylthio; with (b) a compound of the formula:

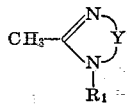

wherein R$_1$ is selected from the group consisting of hydrogen and methyl; and Y is selected from the group consisting of ethylene and trimethylene, the improvement which comprises conducting the condensation in the presence of at least an equimolar proportion, based upon the amount of by-product water to be produced, of a chemical water scavenger selected from the group consisting of:

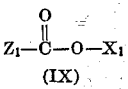

(IX)

and

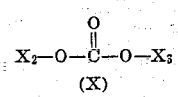

(X)

wherein Z$_1$ is selected from the group consisting of hydrogen and chloro; X$_1$ is selected from the group consisting of alkyl, cycloalkyl costaining from 3 to 6 carbon atoms, allyl, crotyl, benzyl and

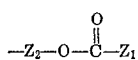

wherein $Z_2$ is alkylene having from 2 to 4 carbon atoms; $X_2$ and $X_3$ when taken separately are each alkyl; and $X_2$ and $X_3$ when taken together form an alkylene bridge having from 2 to 4 carbon atoms.

2. The process of claim 1 wherein the product is recovered as an acid addition salt.

3. The process of claim 2 wherein the condensation is conducted at a temperature of from about 0° C. to about 70° C.

4. The process of claim 3 wherein the molar ratio of reactant II:reactant VIII:scavenger is from about 1:1:1 to about 1:2:4.

5. The process of claim 4 wherein the chemical water scavenger is selected from the group consisting of methyl formate, ethyl formate, dimethyl carbonate and diethyl carbonate.

6. The process of claim 5 wherein $R_2$ is:

wherein $R_5$ is selected from the group consisting of hydrogen and o-methyl; $R_1$ is methyl and Y is trimethylene.

7. The process of claim 5 wherein $R_2$ is:

wherein $R_3$ is selected from the group consisting of hydrogen and methyl; $R_1$ is methyl and Y is trimethylene.

8. The process of claim 7 wherein the product is recovered as an acid addition salt selected from the group consisting of the hydrochloride, citrate and tartrate salts.

9. The process of claim 8 wherein $R_2$ is:

wherein $R_3$ is methyl; $R_1$ is methyl; Y is trimethylene, the temperature is from about 25° C. to about 70° C., the chemical water scavenger is methyl formate and the acid addition salt is the tartrate.

10. The process of claim 8 wherein $R_3$ is hydrogen; $R_1$ is methyl; Y is trimethylene, the temperature is from about 25° C. to about 70° C., the chemical water scavenger is methyl formate and the acid addition salt is the citrate.

References Cited

FOREIGN PATENTS 681,413 11/1966 Belgium.
14,693 6/1964 Japan.

OTHER REFERENCES

Bennet et al., J. Chem. Soc. 1929, pages 1467 to 1468.
Chemical Abstracts I, vol. 56, cols. 8214 to 8215 (1962).
Chemical Abstracts II, vol. 58, cols. 9049 to 9050 (1963).
Chemical Abstracts III, vol. 61, cols. 16075 to 16076 (1964).
Chemical Abstracts IV, vol. 65, cols. 3869 to 3870 (1966) (Abstract of Fujita et al.).

JOHN D. RANDOLPH, Primary Examiner

U.S. Cl. X.R.

260—332.3, 424—273